United States Patent
Chen et al.

(10) Patent No.: US 11,976,935 B2
(45) Date of Patent: May 7, 2024

(54) ROUTE RECOMMENDATION METHOD, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Hao Chen, Beijing (CN); Runmei Zhao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 139 days.

(21) Appl. No.: 17/640,816

(22) PCT Filed: Jun. 2, 2021

(86) PCT No.: PCT/CN2021/097901
§ 371 (c)(1),
(2) Date: Mar. 5, 2022

(87) PCT Pub. No.: WO2022/134478
PCT Pub. Date: Jun. 30, 2022

(65) Prior Publication Data
US 2023/0152117 A1    May 18, 2023

(30) Foreign Application Priority Data
Dec. 24, 2020    (CN) .......................... 202011546162.7

(51) Int. Cl.
*G01C 21/36*    (2006.01)
(52) U.S. Cl.
CPC ................ *G01C 21/3682* (2013.01)
(58) Field of Classification Search
CPC ...... G01C 21/3682; G06N 20/00; G06N 5/04; G06N 3/02; G06Q 10/02; G06Q 30/0282;
(Continued)

(56) References Cited

U.S. PATENT DOCUMENTS

| 11,282,026 B2 * | 3/2022 | Fan ................. G06Q 10/08355 |
| 2009/0216633 A1 | 8/2009 | Whitsett et al. |

(Continued)

FOREIGN PATENT DOCUMENTS

| CN | 105159933 B | 4/2019 |
| CN | 110096645 A | 8/2019 |

(Continued)

OTHER PUBLICATIONS

International Search Report and Written Opinion, dated Sep. 24, 2021, for the corresponding International Application No. PCT/CN2021/097901 in 10 pages.

(Continued)

*Primary Examiner* — Mussa A Shaawat
(74) *Attorney, Agent, or Firm* — Polsinelli PC (57) ABSTRACT

A route recommendation method, an electronic device, and a storage medium are provided, which relate to the field of data processing and especially relate to the field of intelligent recommendation. The method includes: receiving a route recommendation request, wherein the route recommendation request comprises N-dimension itinerary label information; selecting M theme routes from a theme route library according to the N-dimension itinerary label information; determining a recommended route from the M theme routes, wherein the selecting the M theme routes from the theme route library according to the N-dimension itinerary label information, comprises: selecting at least one theme route from the theme route library according to i-th-dimension itinerary label information in the N-dimension itinerary label information and theme information of respective theme routes in the theme route library.

15 Claims, 3 Drawing Sheets

(58) Field of Classification Search
CPC .... G06Q 30/0631; G06Q 50/14; G06Q 50/10; G06F 16/9537; G06F 16/9535; G06F 16/9536
See application file for complete search history.

(56) References Cited

U.S. PATENT DOCUMENTS

| | | | |
|---|---|---|---|
| 2015/0330800 A1 | 11/2015 | Huyi | |
| 2017/0178070 A1* | 6/2017 | Wang | G06Q 10/0832 |
| 2017/0228846 A1* | 8/2017 | Mohr | G06Q 50/28 |
| 2018/0188053 A1* | 7/2018 | Fukuda | H04W 4/024 |
| 2020/0152338 A1* | 5/2020 | Zhou | G10L 13/00 |
| 2022/0067370 A1* | 3/2022 | Huang | G06F 16/23 |

FOREIGN PATENT DOCUMENTS

| | | |
|---|---|---|
| CN | 110765361 A | 2/2020 |
| CN | 111143680 A | 5/2020 |
| CN | 111966929 A | 11/2020 |
| CN | 112632379 A | 4/2021 |
| KR | 20200048756 A | 5/2020 |

OTHER PUBLICATIONS

European Patent Office, Extended European Search Report, issued in connection with European Application No. 21814666.0, dated Apr. 3, 2023 (8 pages).

* cited by examiner

ROUTE RECOMMENDATION METHOD, ELECTRONIC DEVICE, AND STORAGE MEDIUM

CROSS-REFERENCE TO RELATED APPLICATION

The present disclosure is a National Stage application of PCT international application PCT/CN2021/097901, filed on Jun. 2, 2021, which claims priority to Chinese Patent Application No. 202011546162.7, filed with the Chinese Patent Office on Dec. 24, 2020 and entitled "ROUTE RECOMMENDATION METHOD AND APPARATUS, ELECTRONIC DEVICE, AND STORAGE MEDIUM", both of which are incorporated herein by reference in their entireties.

TECHNICAL FIELD

The present disclosure relates to the field of data processing, and in particular, to the field of intelligent recommendation.

BACKGROUND

With the improvement of economy and living standards, the demands for people to travel out are increasingly prosperous.

With the rise of the Internet, more and more users choose to travel freely, to meet their individual needs. Since a destination is generally an area that a user is not familiar with, the user will search for tour routes shared by other users on a travel application (App).

SUMMARY

A route recommendation method and apparatus, an electronic device, and a storage medium are provided by the present disclosure.

According to one aspect of the present disclosure, there is provided a route recommendation method, which includes:
  receiving a route recommendation request, wherein the route recommendation request includes N-dimension itinerary label information, wherein N is a positive integer;
  selecting M theme routes from a theme route library according to the N-dimension itinerary label information, wherein M is a positive integer; and
  determining a recommended route from the M theme routes,
  wherein the selecting the M theme routes from the theme route library according to the N-dimension itinerary label information, includes:
  selecting at least one theme route from the theme route library according to i-th-dimension itinerary label information in the N-dimension itinerary label information and theme information of respective theme routes in the theme route library, wherein i is a positive integer less than or equal to N.

According to another aspect of the present disclosure, there is provided an electronic device, which includes:
  at least one processor; and
  a memory communicatively connected with the at least one processor, wherein
  the memory stores instructions executable by the at least one processor, and the instructions, when executed by the at least one processor, enable the at least one processor to perform the method in any one of embodiments of the present disclosure.

According to another aspect of the present disclosure, there is provided a non-transitory computer-readable storage medium storing computer instructions, wherein the computer instructions, when executed by a computer, cause the computer to perform the method in any one of the embodiments of the present disclosure.

According to the solution of the present disclosure, theme routes are selected respectively with respect to different dimensional itinerary label information in a route recommendation request, and then a recommended route is determined from the selected theme routes.

It should be understood that the content described in this section is not intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure, wherein.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
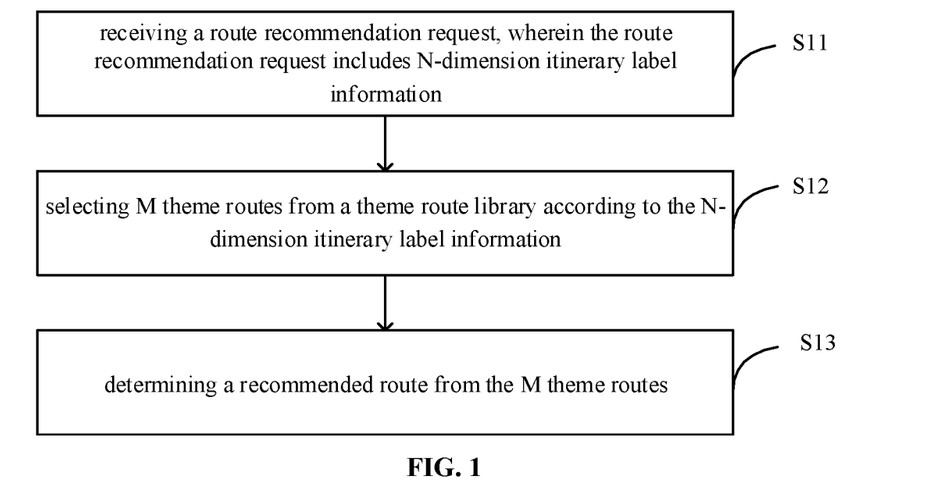
FIG. 1 is a schematic diagram of a route recommendation method according to an embodiment of the present disclosure.

FIG. 1 shows a schematic diagram of a route recommendation method according to an embodiment of the present disclosure. As shown in FIG. 1, the method includes:
  S11, receiving a route recommendation request, wherein the route recommendation request includes N-dimension itinerary label information, wherein N is a positive integer;
  S12, selecting M theme routes from a theme route library according to the N-dimension itinerary label information, wherein M is a positive integer; and S13, determining a recommended route from the M theme routes, wherein, in S11, the selecting the M theme routes from the theme route library according to the N-dimension itinerary label information, includes:

selecting at least one theme route from the theme route library according to i-th-dimension itinerary label information in the N-dimension itinerary label information and theme information of respective theme routes in the theme route library, wherein i is a positive integer less than or equal to N.

Illustratively, the route recommendation request may be triggered based on a user operation. For example, in a case where a user inputs information such as an itinerary destination, itinerary time and the like, an electronic device receives a corresponding route recommendation request.

The aforementioned N dimensions may include user positioning information, map area location information, a user type, an itinerary scene, a travel mode, a new hot index and the like.

Herein, the user positioning information may refer to positioning information when a user inputs itinerary information, for example, a user positioning city. The itinerary label information of the user positioning information dimension is, for example, Beijing, Shanghai, Guangzhou or the like.

The map area location information may be a geographic map area frequently browsed by a user. For example, the user often browses a certain city or a certain scenic area on an electronic map, and the itinerary label information corresponding to the map area location information dimension may be the city or the scenic area.

The user type may include the user's geographic type, status type, age type and the like. The itinerary label information of the user type dimension includes a local user, a nonlocal user, a single user, a family user, an elderly user, a student user, etc.

The itinerary scene may include a season of an itinerary, and the itinerary label information corresponding to the itinerary scene dimension includes spring, summer, autumn, winter or early winter, late winter, etc.

The travel mode may refer to a mode of transportation preferred by a user or a mode of transportation designated by the user. The itinerary label information of the travel mode dimension is, for example, cycling, walking, self-driving, or using public transportation, etc.

The new hot index is used to represent a new hot degree or popularity of a POI (Point of Interest) passed by an itinerary or route. The itinerary label information of the new hot index dimension may be a specific value, which may be determined based on the preference of a user for a new hot spot.

In the embodiment of the present disclosure, M theme routes are first selected from the theme route library according to the itinerary label information of each dimension of the N dimensions. For example, a student user who prefers cycling initiates a route recommendation request for a winter travel, wherein the route recommendation request includes itinerary label information of a plurality of dimensions such as a travel mode, a user type, an itinerary scene and the like. These itinerary label information are cycling, a student user and winter, respectively. Then, a theme route with the theme information including cycling, student-exclusive and winter travel is selected from the theme route library. Herein, the number of various theme routes is not limited.

After the M theme routes are selected, the itinerary corresponding to the route recommendation request and relevant information of the user can be comprehensively considered, and the most suitable route can be selected from the M theme routes as a recommended route. Herein, the relevant information of the itinerary includes, for example, weather information in an itinerary period, a planned itinerary duration, the number of days of the itinerary, itinerary scenes, etc. The relevant information of the user includes user profiles such as gender, age and other information, user interests such as food consumption price preference, accommodation preference and the like, and user behaviors such as browsing behaviors on a travel App, etc. For example, after the cycling theme route and the winter travel theme route are selected, the scene and the weather information of the itinerary period are considered comprehensively, and the winter travel theme route is selected from the cycling theme route and the winter travel theme route as a recommended route. Illustratively, the recommended route may be determined from M theme routes based on a preset rule, a model, or a user selection.

According to the route recommendation method provided by the embodiment of the present disclosure, theme routes are selected respectively with respect to different dimensional itinerary label information in a route recommendation request, and then a recommended route is determined from the selected theme routes. Therefore, a route with a strong theme can be automatically and efficiently recommend with respect to individual needs corresponding to the route recommendation request.

In an exemplary implementation, in the above S12, the selecting the at least one theme route from the theme route library according to i-th-dimension itinerary label information in the N-dimension itinerary label information and the theme information of the respective theme routes in the theme route library, includes:

determining similarities between the i-th-dimension itinerary label information and the theme information of the respective theme routes in the theme route library; and selecting the at least one theme route from the theme route library according to the similarities.

For example, the itinerary label information of the user positioning information dimension is Beijing, that is, the theme information such as Beijing surrounding tour, Forbidden City Tour, etc., have high similarity with the itinerary label information, and the theme information such as Guangzhou surrounding tour has low similarity with the itinerary label information. Therefore, a theme route with the theme information such as the Beijing surrounding tour, the Forbidden City tour, etc. is selected, and a theme route with the theme information such as the Guangzhou surrounding tour is not selected.

Illustratively, the selecting the at least one theme route from the theme route library according to the similarities, includes: selecting at least one theme route with a similarity greater than a preset threshold from the theme route library.

Herein, the similarity can be determined based on a similarity calculation model or a feature distance between the itinerary label information and the theme information.

According to the above exemplary implementation, the degree of matching between the itinerary label information and the theme information is quantified by using similarities, and a theme route matching with the itinerary label information can be selected accurately.

In an exemplary implementation, in the above S13, the determining the recommended route from the M theme routes, includes:

obtaining scores for respective theme routes of the M theme routes by using a preset model, based on the M theme routes and user information corresponding to the route recommendation request; and determining the recommended route from the M theme routes according to the scores.

Illustratively, the preset model may include a rank model or a classification model obtained based on supervised training. In practical applications, a DCN (Deep & Cross Network) and the like can be selected to implement.

The user information corresponding to the above route recommendation request may include user profiles, user interests, user behaviors, and the like. Herein, the user profiles include, for example, gender, age, etc., the user interests include, for example, food consumption price preference, accommodation preference, etc., and the user behaviors include, for example, a browsing behavior, a retrieval behavior, and a map poke behavior on a travel App or an electronic map App.

Illustratively, the theme information of the theme route, the itinerary label information and the user information may be input into the preset model, to obtain a score of the theme route output by the preset model. The score Score can be determined by referring to the following formula:

$$Score = f(user\_profile, user\_interest, user\_action, scene, theme\_info)$$

wherein user_profile represents a user profile, user_interest represents a user preference, user_action represents a user behavior, scene represents the scene information in the itinerary label information, and theme_info represents the theme information of the theme route. $f(*)$ represents a function corresponding to the preset model.

Figure 2:
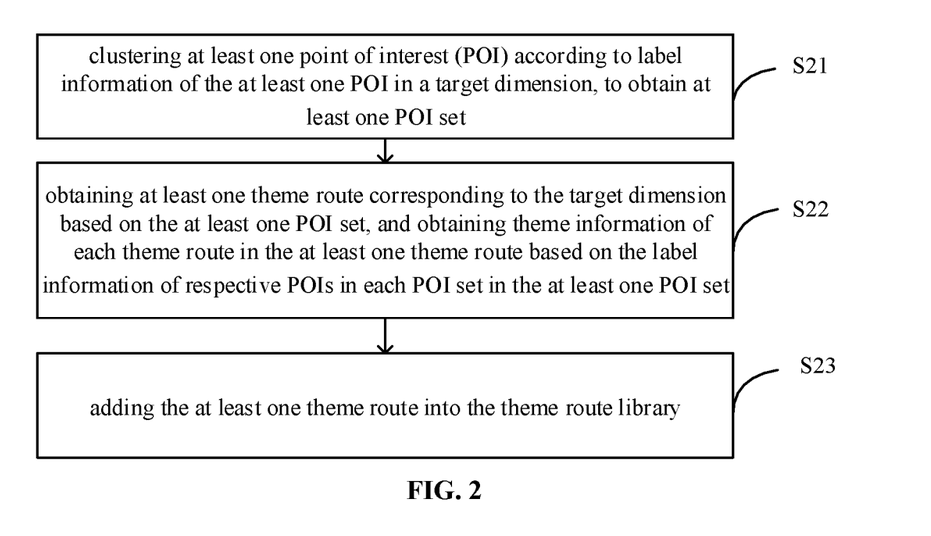
FIG. 2 is a schematic diagram of a route recommendation method according to another embodiment of the present disclosure.

An embodiment of the present disclosure further provides an approach of generating the above theme route. Specifically, FIG. 2 shows a route recommendation method provided by another embodiment of the present disclosure. The method may include:

S21, clustering at least one point of interest (POI) according to label information of the at least one POI in a target dimension, to obtain at least one POI set;

S22, obtaining at least one theme route corresponding to the target dimension based on the at least one POI set, and obtaining theme information of each theme route in the at least one theme route based on the label information of respective POIs in each POI set in the at least one POI set; and S23, adding the at least one theme route into the theme route library.

Illustratively, the target dimension may include a location, a recommended user type, recommended play time, a recommended travel mode, characteristic information and a new hot index of the POI, etc.

Herein, the label information of the recommended user type dimension of the POI may be a local user or a nonlocal user. Using an electronic map App, the ratio of the number of times that local users and nonlocal users interact with a certain POI in a map can be counted according to users' interactions with the POI in the map, such as clicking or navigation behaviors, in combination with the information of respective users' habitual residences. For example, the ratio of local and nonlocal users' interactions with the Baiwang Mountain of Beijing may be local:nonlocal=99:1, thus the label information of the Baiwang Mountain in the recommended user type dimension is the local user.

The recommended play time of the POI may include a recommended play season, month, and time period (such as morning, noon and evening). The number of people flow of the POI at different times can be counted by trajectory data of the electronic map App. Based on the number of people flow and business hours, the label information of the recommended play time of the POI can be determined, such as spring or summer, Monday or weekend, or the like.

The label information of the recommended travel mode dimension of the POI may be cycling, walking, self-driving, or using public transportation. The navigation mode distribution information of users going to and from the POI can be counted by using navigation data of the electronic map App, to obtain the recommended travel mode of the POI.

The label information of the characteristic information dimension of the POI may include keywords extracted and mined from user comments and third-party open data, such as red autumnal leaves, Northwest, Grassland, Parent-child, Internet celebrity check-in, etc.

The label information of the new hot index of the POI is a specific new hot index value. Based on the statistical information of the electronic map App and third-party open data, the new hot index of the POI can be mined. For example, the Palace Museum, which is open for a limited time and is in the 600-year exhibition, has a high new hot index, and the Baiwang Mountain, which has no popular activities and has been open for many years, has a low new hot index. The new hot index can be updated regularly.

In the embodiment of the present disclosure, POIs are clustered according to the label information of the POIs in a certain dimension, so that at least one POI set can be obtained. The label information corresponding to different POI sets have great difference, and the label information of respective POIs in the same POI set have small difference. Based on respective POIs in each POI set in the at least one POI set, a theme route including the respective POIs can be obtained. Herein, the theme information of the theme route is the same or similar to the label information of the respective POIs in a target dimension.

For example, clustering is performed based on the recommended play times of POIs, such that POIs suitable for spring play can be grouped into one category and POIs suitable for summer play can be grouped into another category. A theme route is obtained based on POIs of the same category, such that theme routes suitable for spring play and routes suitable for summer travel can be obtained.

Similarly, clustering based on the location can obtain a plurality of theme routes located in different location areas or cities, such as the theme routes of Forbidden City surrounding tour or the theme routes of Beijing must-see sights.

Clustering based on the travel mode can obtain the theme route of self-driving tour, the theme route of cycling, etc.

Clustering based on the characteristic information can obtain the theme route of the Red autumnal leaves tour, the theme route of the parent-child tour, etc.

Clustering based on the new hot information can obtain, for example, exhibition theme routes that cannot be missed in October.

It can be seen that according to the above-mentioned implementation, it is possible to mine a theme route with a strong theme and a fun theme for a specific user's needs, which is beneficial to recommend a route for users to meet their individual needs. In addition, since the theme route is automatically generated, a user does not need to spend time and effort to design a theme route, such that the pressure of manual content generation can be reduced and route recommendation can be performed efficiently.

Illustratively, the above route recommendation method may further include:

determining at least one of a tour sequence, tour time and a travel mode of each POI in the recommended route, according to user preference information corresponding to the route recommendation request and information of the POI in the recommended route.

In practical applications, play routes and specific time arrangements can be automatically generated by combining travel-related information such as user departure time, travel compactness degree, etc., as well as user preference information such as travel mode preference (airplane/train/self-driving/bus, etc.), travel distance preference (short/long distance, etc.), and location information, estimated stay duration, etc. of respective POIs. For example, it is possible to recommend self-driving routes for car owners, and public transportation routes for non-car owners. For another example, it is possible to recommend time schedules with different degrees of compactness for college students and users with children at home, for example, the college students are scheduled for two days, and the users with children at home are scheduled for three days.

According to the foregoing implementation manner, the play itinerary of each POI in the recommended route can be automatically planned, which reduces the pressure of manual planning and improves user experience.

Illustratively, the above route recommendation method may further include:

displaying, on an electronic map, the recommended route and recommended information about accommodations within a preset range of each POI in the recommended route.

Herein, the recommended information about accommodations may include recommended food information and recommended hotel information.

Illustratively, the electronic map may be a map in an electronic map App. The recommended food information and the recommended hotel information can be obtained based on the existing surrounding location recommendation capabilities of the electronic map, in combination with user interests (such as food consumption prices, hotel preferences, etc.). A more complete travel guide can be obtained based on the recommended route and the planning and arrangement of each POI in the recommended route, and the recommended food information and the recommended hotel information.

In actual applications, the board and lodging recommendation information can be determined according to the tour time of each POI. For example, in a case where it is lunch time after a certain scenic spot in an itinerary has been visited, surrounding foods are intelligently recommended for a user, and the surrounding foods are displayed in the display area of the scenic spot on the electronic map. For another example, surrounding hotels are displayed in the display area of the last scenic spot on a certain day.

Figure 3:
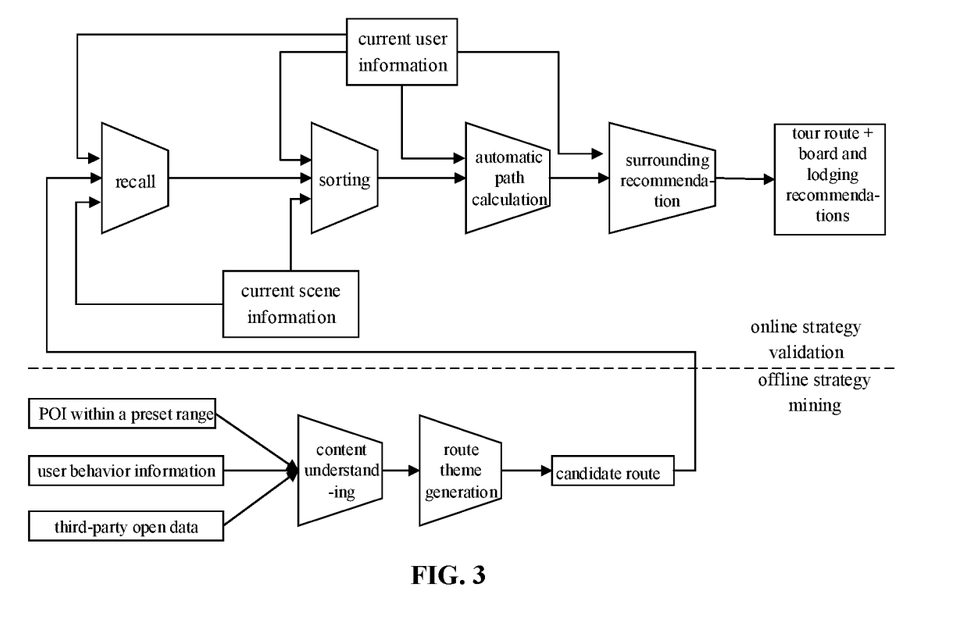
FIG. 3 is a schematic diagram of an application example of a route recommendation method according to the present disclosure.

FIG. 3 shows a schematic diagram of an application example of a route recommendation method provided by an embodiment of the present disclosure. As shown in FIG. 3, the overall route recommendation method can be divided into two parts: offline strategy mining and online strategy validation. Herein, the offline strategy mining part can generate a theme route by acquiring POIs within a preset range, user behavior information and third-party open data and performing content understanding on these contents, to obtain a theme route library, wherein the theme route will serve as a candidate route. The online strategy validation part includes a recall module, a sorting module, an automatic route calculation module, and a surrounding recommendation module. Herein, the recall module selects at least one theme route from the theme route library according to current scene information and user information. The sorting module sorts the at least one theme route according to a preset model, to obtain a recommended route. The automatic route calculation module plans specific arrangement information of respective POIs in the recommended route based on the recommended route and the user information, and the surrounding recommendation module recommends board and lodging recommendation information for a user. In this way, a comprehensive travel guide combining travel routes and board and lodging recommendations can be obtained.

It can be seen that according to the method provided by the embodiments of the present disclosure, theme routes are selected respectively with respect to different dimensional itinerary label information in a route recommendation request, and then a recommended route is determined from the selected theme routes. Therefore, a route with a strong theme can be automatically and efficiently recommend with respect to individual needs corresponding to the route recommendation request.

Figure 4:
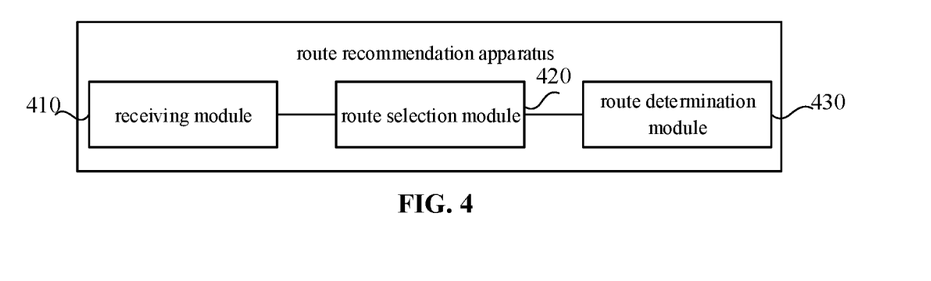
FIG. 4 is a schematic diagram of a route recommendation apparatus according to an embodiment of the present disclosure.

As an implementation of the above methods, the present disclosure also provides a route recommendation apparatus. As shown in FIG. 4, the apparatus includes:

a receiving module 410 configured for receiving a route recommendation request, wherein the route recommendation request includes N-dimension itinerary label information, wherein N is a positive integer;

a route selection module 420 configured for selecting M theme routes from a theme route library according to the N-dimension itinerary label information, wherein M is a positive integer; and a route determination module 430 configured for determining a recommended route from the M theme routes, wherein the route selection module is further configured for selecting at least one theme route from the theme route library according to i-th-dimension itinerary label information in the N-dimension itinerary label information and theme information of respective theme routes in the theme route library, wherein i is a positive integer less than or equal to N.

Figure 5:
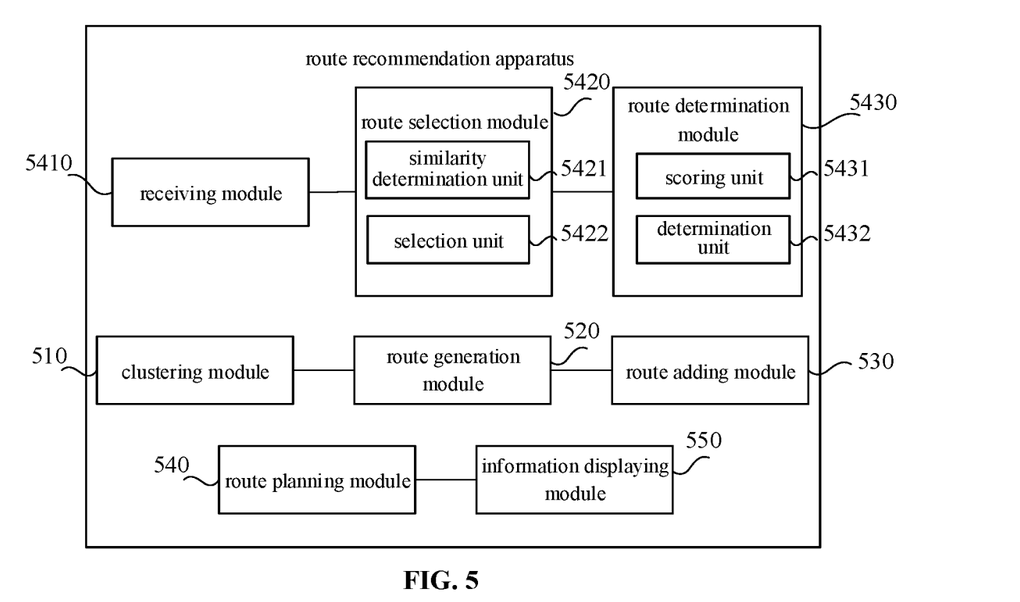
FIG. 5 is a schematic diagram of a route recommendation apparatus according to another embodiment of the present disclosure.

A receiving module 5410, a route selection module 5420, and a route determination module 5430 shown in FIG. 5 are modules same as or similar to the receiving module 410, the route selection module 420, and the route determination module 430 shown in FIG. 4, respectively.

Illustratively, as shown in FIG. 5, the route selection module 5420 includes:

a similarity determination unit 5421 configured for determining similarities between the i-th-dimension itinerary label information and the theme information of the respective theme routes in the theme route library; and a selection unit 5422 configured for selecting the at least one theme route from the theme route library according to the similarities.

Illustratively, as shown in FIG. 5, the route determination module 5430 includes:

a scoring unit 5431 configured for obtaining scores for respective theme routes of the M theme routes by using a preset model, based on the M theme routes and user information corresponding to the route recommendation request; and a determination unit 5432 configured for determining the recommended route from the M theme routes according to the scores.

Illustratively, as shown in FIG. 5, the apparatus further includes:

a clustering module 510 configured for clustering at least one point of interest (POI) according to label information of the at least one POI in a target dimension, to obtain at least one POI set;

a route generation module 520 configured for obtaining at least one theme route corresponding to the target dimension based on the at least one POI set, and obtaining theme information of each theme route in the at least one theme route based on the label information of respective POIs in each POI set in the at least one POI set; and a route adding module 530 configured for adding the at least one theme route into the theme route library.

Illustratively, as shown in FIG. 5, the apparatus further includes:

a route planning module 540 configured for determining at least one of a tour sequence, tour time and a travel mode of each POI in the recommended route, according to user preference information corresponding to the route recommendation request and information of the POI in the recommended route.

Illustratively, as shown in FIG. 5, the apparatus further includes:

an information displaying module 550 configured for displaying, on an electronic map, the recommended route and recommended information about accommodations within a preset range of each POI in the recommended route.

The apparatus provided in the embodiment of the present disclosure has technical effects corresponding to the method provided by the embodiment of the present disclosure.

According to embodiments of the present disclosure, the present disclosure also provides an electronic device, a readable storage medium, and a computer program product.

Figure 6:
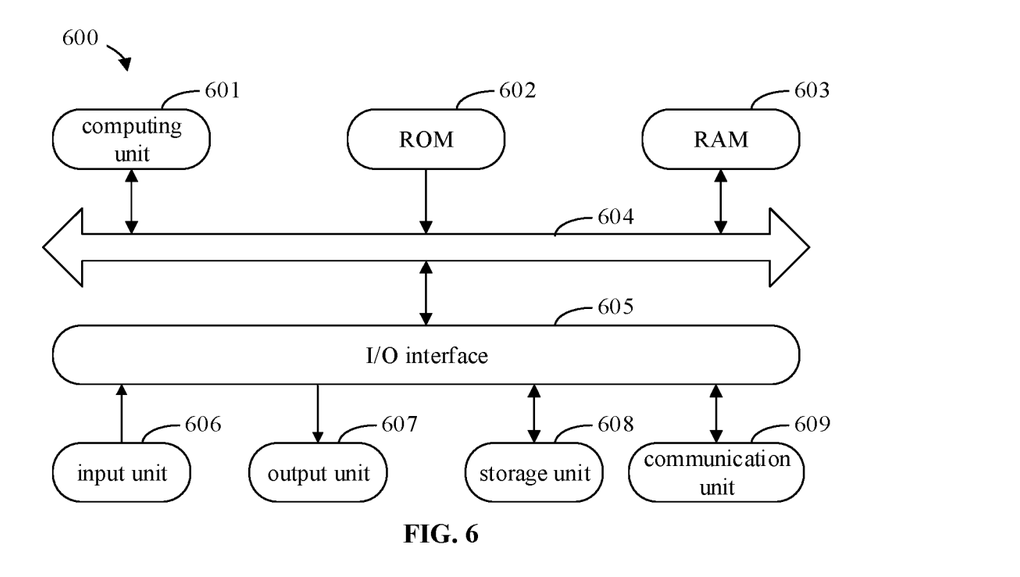
FIG. 6 is a block diagram of an electronic device for implementing a route recommendation method according to an embodiment of the present disclosure.

FIG. 6 shows a schematic diagram of an example electronic device 600 configured for implementing the embodiment of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 6, the electronic device 600 includes a computing unit 601 that may perform various suitable actions and processes in accordance with computer programs stored in a read only memory (ROM) 602 or computer programs loaded from a storage unit 608 into a random access memory (RAM) 603. In the RAM 603, various programs and data required for the operation of the electronic device 600 may also be stored. The computing unit 601, the ROM 602 and the RAM 603 are connected to each other through a bus 604. An input/output (I/O) interface 605 is also connected to the bus 604.

A plurality of components in the electronic device 600 are connected to the I/O interface 605, including: an input unit 606, such as a keyboard, a mouse, etc.; an output unit 607, such as various types of displays, speakers, etc.; a storage unit 608, such as a magnetic disk, an optical disk, etc.; and a communication unit 609, such as a network card, a modem, a wireless communication transceiver, etc. The communication unit 609 allows the electronic device 600 to exchange information/data with other devices over a computer network, such as the Internet, and/or various telecommunications networks.

The computing unit 601 may be various general purpose and/or special purpose processing assemblies having processing and computing capabilities. Some examples of the computing unit 601 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 601 performs various methods and processes described above, such as the route recommendation method. For example, in some embodiments, the route recommendation method may be implemented as computer software programs that are physically contained in a machine-readable medium, such as the storage unit 608. In some embodiments, some or all of the computer programs may be loaded into and/or installed on the electronic device 600 via the ROM 602 and/or the communication unit 609. In a case where the computer programs are loaded into the RAM 603 and executed by the computing unit 601, one or more of steps of the route recommendation method may be performed. Alternatively, in other embodiments, the computing unit 601 may be configured to perform the route recommendation method in any other suitable manner (e.g., by means of a firmware).

Various embodiments of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

The program codes for implementing the methods of the present disclosure may be written in any combination of one or more programming languages. These program codes may be provided to a processor or controller of a general purpose computer, a special purpose computer, or other programmable data processing apparatus such that the program codes, when executed by the processor or controller, enable the functions/operations specified in the flowchart and/or the block diagram to be performed. The program codes may be executed entirely on a machine, partly on a machine, partly on a machine as a stand-alone software package and partly on a remote machine, or entirely on a remote machine or server.

In the context of the present disclosure, the machine-readable medium may be a tangible medium that may contain or store programs for using by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium may include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A computer-implemented route recommendation method, comprising:
   receiving a route recommendation request, wherein the route recommendation request comprises N-dimension itinerary label information, wherein N is a positive integer, and N dimensions comprise at least one of: user positioning information, map area location information, a user type, an itinerary scene, a travel mode, a new hot index;
   selecting M theme routes from a theme route library according to the N-dimension itinerary label information, wherein M is a positive integer;
   determining a recommended route from the M theme routes; and
   displaying the recommended route on an electronic map,
   wherein the selecting the M theme routes from the theme route library according to the N-dimension itinerary label information, comprises:
   selecting at least one theme route from the theme route library according to i-th-dimension itinerary label information in the N-dimension itinerary label information and theme information of respective theme routes in the theme route library, wherein i is a positive integer less than or equal to N,
   wherein the method further comprises:
   clustering at least one point of interest (POI) according to label information of the at least one POI in a target dimension, to obtain at least one POI set;
   obtaining at least one theme route corresponding to the target dimension based on the at least one POI set, and obtaining theme information of each theme route in the at least one theme route based on the label information of respective POIs in each POI set in the at least one POI set; and
   adding the at least one theme route into the theme route library,
   wherein the clustering comprises clustering based on recommended play times of POIs, clustering based on a location, clustering based on a travel mode, clustering based on a characteristic information, or clustering based on a new hot information.

2. The method of claim 1, wherein the selecting the at least one theme route from the theme route library according to the i-th-dimension itinerary label information in the N-dimension itinerary label information and the theme information of the respective theme routes in the theme route library, comprises:
   determining similarities between the i-th-dimension itinerary label information and the theme information of the respective theme routes in the theme route library; and
   selecting the at least one theme route from the theme route library according to the similarities.

3. The method of claim 1, wherein the determining the recommended route from the M theme routes, comprises:
   obtaining scores for respective theme routes of the M theme routes by using a preset model, based on the M theme routes and user information corresponding to the route recommendation request; and
   determining the recommended route from the M theme routes according to the scores.

4. The method of claim 1, further comprising:
   determining at least one of a tour sequence, tour time and a travel mode of each POI in the recommended route, according to user preference information corresponding to the route recommendation request and information of the POI in the recommended route.

5. The method of claim 1, further comprising:
displaying, on an electronic map, recommended information about accommodations within a preset range of each POI in the recommended route.

6. An electronic device, comprising:
at least one processor; and
a memory communicatively connected with the at least one processor, wherein
the memory stores instructions executable by the at least one processor, and the instructions, when executed by the at least one processor, enable the at least one processor to perform operations of:
receiving a route recommendation request, wherein the route recommendation request comprises N-dimension itinerary label information, wherein N is a positive integer, and N dimensions comprise at least one of: user positioning information, map area location information, a user type, an itinerary scene, a travel mode, a new hot index;
selecting M theme routes from a theme route library according to the N-dimension itinerary label information, wherein M is a positive integer;
determining a recommended route from the M theme routes; and
displaying the recommended route on an electronic map,
wherein the selecting the M theme routes from the theme route library according to the N-dimension itinerary label information, comprises:
selecting at least one theme route from the theme route library according to i-th-dimension itinerary label information in the N-dimension itinerary label information and theme information of respective theme routes in the theme route library, wherein i is a positive integer less than or equal to N,
wherein the at least one processor is further configured for:
clustering at least one point of interest (POI) according to label information of the at least one POI in a target dimension, to obtain at least one POI set;
obtaining at least one theme route corresponding to the target dimension based on the at least one POI set, and obtaining theme information of each theme route in the at least one theme route based on the label information of respective POIs in each POI set in the at least one POI set; and
adding the at least one theme route into the theme route library,
wherein the clustering comprises clustering based on recommended play times of POIs, clustering based on a location, clustering based on a travel mode, clustering based on a characteristic information, or clustering based on a new hot information.

7. A non-transitory computer-readable storage medium storing computer instructions, wherein the computer instructions, when executed by a computer, cause the computer to perform operations of:
receiving a route recommendation request, wherein the route recommendation request comprises N-dimension itinerary label information, wherein N is a positive integer, and N dimensions comprise at least one of: user positioning information, map area location information, a user type, an itinerary scene, a travel mode, a new hot index;
selecting M theme routes from a theme route library according to the N-dimension itinerary label information, wherein M is a positive integer;
determining a recommended route from the M theme routes; and
displaying the recommended route on an electronic map,
wherein the selecting the M theme routes from the theme route library according to the N-dimension itinerary label information, comprises:
selecting at least one theme route from the theme route library according to i-th-dimension itinerary label information in the N-dimension itinerary label information and theme information of respective theme routes in the theme route library, wherein i is a positive integer less than or equal to N,
wherein the computer instructions, when executed by the computer, further cause the computer to perform operations of:
clustering at least one point of interest (POI) according to label information of the at least one POI in a target dimension, to obtain at least one POI set;
obtaining at least one theme route corresponding to the target dimension based on the at least one POI set, and obtaining theme information of each theme route in the at least one theme route based on the label information of respective POIs in each POI set in the at least one POI set; and
adding the at least one theme route into the theme route library,
wherein the clustering comprises clustering based on recommended play times of POIs, clustering based on a location, clustering based on a travel mode, clustering based on a characteristic information, or clustering based on a new hot information.

8. The electronic device of claim 6, wherein the selecting the at least one theme route from the theme route library according to the i-th-dimension itinerary label information in the N-dimension itinerary label information and the theme information of the respective theme routes in the theme route library, comprises:
determining similarities between the i-th-dimension itinerary label information and the theme information of the respective theme routes in the theme route library; and
selecting the at least one theme route from the theme route library according to the similarities.

9. The electronic device of claim 6, wherein the determining the recommended route from the M theme routes, comprises:
obtaining scores for respective theme routes of the M theme routes by using a preset model, based on the M theme routes and user information corresponding to the route recommendation request; and
determining the recommended route from the M theme routes according to the scores.

10. The electronic device of claim 6, wherein the instructions, when executed by the at least one processor, enable the at least one processor further to perform an operation of:
determining at least one of a tour sequence, tour time and a travel mode of each POI in the recommended route, according to user preference information corresponding to the route recommendation request and information of the POI in the recommended route.

11. The electronic device of claim 6, wherein the instructions, when executed by the at least one processor, enable the at least one processor further to perform an operation of:

displaying, on an electronic map, recommended information about accommodations within a preset range of each POI in the recommended route.

12. The non-transitory computer-readable storage medium of claim 7, wherein the selecting the at least one theme route from the theme route library according to the i-th-dimension itinerary label information in the N-dimension itinerary label information and the theme information of the respective theme routes in the theme route library, comprises:
   determining similarities between the i-th-dimension itinerary label information and the theme information of the respective theme routes in the theme route library; and
   selecting the at least one theme route from the theme route library according to the similarities.

13. The non-transitory computer-readable storage medium of claim 7, wherein the determining the recommended route from the M theme routes, comprises:
   obtaining scores for respective theme routes of the M theme routes by using a preset model, based on the M theme routes and user information corresponding to the route recommendation request; and
   determining the recommended route from the M theme routes according to the scores.

14. The non-transitory computer-readable storage medium of claim 7, wherein the computer instructions, when executed by the computer, cause the computer further to perform an operation of:
   determining at least one of a tour sequence, tour time and a travel mode of each POI in the recommended route, according to user preference information corresponding to the route recommendation request and information of the POI in the recommended route.

15. The non-transitory computer-readable storage medium of claim 7, wherein the computer instructions, when executed by the computer, cause the computer further to perform an operation of:
   displaying, on an electronic map, recommended information about accommodations within a preset range of each POI in the recommended route.

* * * * *